United States Patent [19]

Ballard et al.

[11] Patent Number: 4,860,231

[45] Date of Patent: Aug. 22, 1989

[54] CALIBRATION TECHNIQUE FOR VARIABLE SPEED MOTORS

[75] Inventors: Gary W. Ballard; Kevin D. Thompson, both of Indianapolis, Ind.

[73] Assignee: Carrier Corporation, Syracuse, N.Y.

[21] Appl. No.: 144,682

[22] Filed: Jan. 13, 1988

Related U.S. Application Data

[63] Continuation of Ser. No. 809,466, Dec. 16, 1985, abandoned.

[51] Int. Cl.$^4$ .................. G01F 25/00; B61D 27/00; H02P 5/34; G05B 13/02
[52] U.S. Cl. .................. 364/571.01; 364/148; 364/510; 165/40; 236/49.1; 236/DIG. 9; 318/254; 318/802; 324/158 MG
[58] Field of Search .............. 364/148, 150, 510, 571, 364/571.01; 73/116; 165/40; 318/138, 254, 332, 799, 802; 236/49 A-49D, 49 R, 94, DIG. 9; 62/80, 140, 154; 324/158 MG, 74; 417/22, 42, 45, 53

[56] References Cited

U.S. PATENT DOCUMENTS

| | | | |
|---|---|---|---|
| 3,873,901 | 3/1975 | Beery et al. | 318/332 |
| 4,090,663 | 5/1978 | Bonne et al. | 165/40 X |
| 4,462,217 | 7/1984 | Fehr | 417/45 X |
| 4,468,171 | 8/1984 | Katsumata et al. | 417/53 |
| 4,486,693 | 12/1984 | Hamati et al. | 364/148 X |
| 4,500,821 | 2/1985 | Bitting et al. | 318/138 X |
| 4,518,318 | 5/1985 | Jensen et al. | 417/53 |
| 4,549,601 | 10/1985 | Wellman et al. | 236/49 |
| 4,604,036 | 8/1986 | Sutou et al. | 417/45 X |
| 4,638,233 | 1/1987 | Erdman | 318/644 |
| 4,644,238 | 2/1987 | Hirosaki | 318/332 |
| 4,648,551 | 3/1987 | Thompson et al. | 236/DIG. 9 |
| 4,653,285 | 3/1987 | Pohl | 62/154 X |
| 4,688,547 | 8/1987 | Ballard et al. | 236/DIG. 9 |

OTHER PUBLICATIONS

Ashrae Handbook & Product Directory, 1977 Fundamentals, 1978 (sent previously).
American National Standard for Gas-Fired Central Furnaces, 1978 (ANSI Z21.47.1978).
Addenda to Gas-Fired Central Furnaces, 1980 (ANSI Z21.47a-1980).
Addenda to Gas-Fired Central Furnaces, 1985 (ANSI Z21.47a-1985).

*Primary Examiner*—Parshotam S. Lall
*Assistant Examiner*—Joseph L. Dixon
*Attorney, Agent, or Firm*—David J. Zobkiw

[57] ABSTRACT

A variable speed motor is regulated responsive to the load torque acting on the blower wheel. The load torque acting on the blower wheel is determined by means of a coast down procedure in which the motor is briefly de-energized and the rate of angular change $d\omega/dt$ is determined. The load torque acting on the blower wheel can be determined knowing the moment of inertia and $d\omega/dt$. The average motor RPM during the coast down is then related to a torque value where an RPM vs. CFM relationship has been empirically determined for that blower wheel. A microprocessor then computes the final motor RPM necessary to achieve the desired air delivery (CFM) using the fan law equations.

7 Claims, 6 Drawing Sheets

CALIBRATION TECHNIQUE FOR VARIABLE SPEED MOTORS

This application is a continuation of application Ser. No. 809,466 filed Dec. 16, 1985, now abandoned.

BACKGROUND OF THE INVENTION

Electronically commutated motors or ECMs provide variable speed operation while maintaining an efficiency of 70% over the speed range thereby affording a major reduction in power consumption as compared to conventional motors. The speed of an ECM can be detected to provide speed indicating information to an electronic commutating circuit which commutates the ECM in response thereto. The control signal for commutating the ECM is indicative of a desired condition to be achieved and controls the degree of energization of the stator windings of the ECM. The use of ECMs for circulating air delivery in a furnace, for example, incorporates an adaptive blower motor control algorithm which involves adjustment of the blower motor speed input signal to provide the desired air delivery. Conventionally, each motor is adjusted by selecting the appropriate speed tap to obtain the desired air delivery. In addition to the time and labor involved in individual calibration, the resultant calibrations are subject to the effects of aging, temperature drift and variations in load.

SUMMARY OF THE INVENTION

The present invention is directed to a calibration and control technique using an ECM which allows the load on the air delivery system to be sensed and responsive thereto the speed of the ECM can be varied to maintain the desired air delivery (CFM). To control the motor so that it maintains an appropriate air delivery for a specified air temperature rise in a furnace or given air delivery for a specific cooling load, a reference torque was assumed and the corresponding RPM vs. CFM relationship was empirically determined. The actual torque acting on an air moving device such as a blower wheel or fan to slow it down is a function of the moment of inertia of the blower wheel or fan together with the motor rotor and the change in angular velocity of the wheel over a short time interval. During the short time interval, two instantaneous RPM readings are taken over one revolution at the same rotor position, thus eliminating variations due to vibrations. Then, using the fan laws and assuming a constant system for the remainder of the cycle, the motor speed can be adjusted to deliver the desired air flow (CFM). This technique thereby allows a furnace or cooling system to be used in zoned air distribution systems where dampers are employed for controlling air volumes to individual zones. Since, with the aid of this calibration technique, variations in the system load can be sensed and the speed of the blower or fan motor adjusted to maintain the optimum volume of air across a heat exchanger or cooling coil.

This technique can be applied to induced draft furnaces to improve their steady state efficiency by maintaining the flow of combustion air at the optimum level over a wide variation of inducer vent pipe lengths. Further, this technique can be used on any variable speed motor system where the instantaneous RPM can be measured and the inertia of the blower wheel or fan is significantly larger than the inertia of the motor rotor.

It is an object of this invention to provide a calibration and control technique where the load acting on a blower wheel or fan can be sensed using the coast down procedure which permits a microprocessor to calculate the desired RPM with the aid of the measured blower load, calibration equation and fan laws, and then adjust the motor speed input signal until this RPM is obtained.

It is another object of this invention to provide a coast down technique which can be applied to any variable speed motor and blower wheel or fan blade system where the moment of inertia of the blower wheel or fan blades is significantly larger than the inertia of the rotating member of the motor.

It is a further object of this invention to provide a technique which allows furnaces used on zoned air distribution systems to maintain constant air delivery through the furnace to maintain the desired temperature rise or across a cooling coil to maintain the desired air flow through the coil for optimum efficiency. These objects, and others as will become apparent hereinafter, are accomplished by the present invention.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
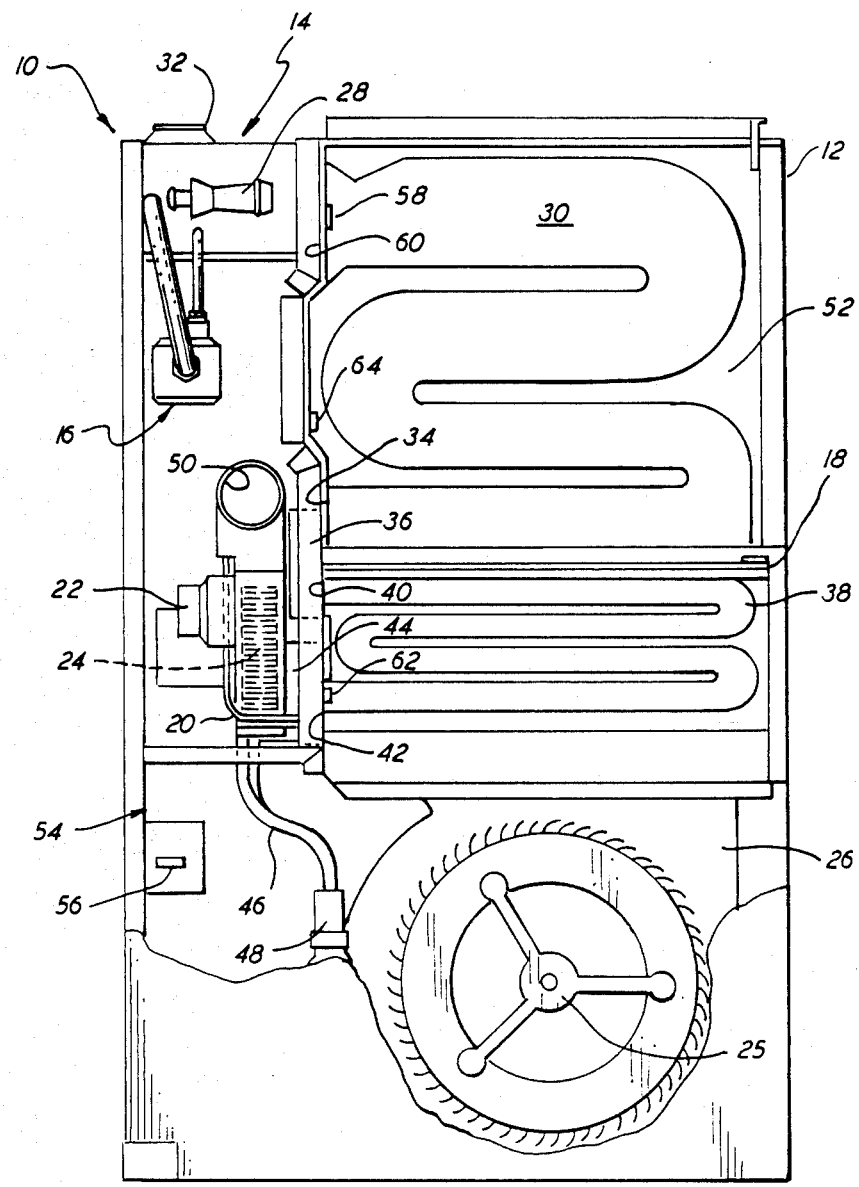
FIG. 1 is a partially cutaway side view of a condensing furnace incorporating the principles of the present invention.

In FIG. 1, the numeral 10 generally designates a gas-fired condensing furnace employing the coast down technique of the present invention. Condensing furnace 10 includes a steel cabinet 12 housing therein burner assembly 14, combination gas control 16, heat exchanger assembly 18, inducer housing 20 supporting inducer motor 22 and inducer wheel 24, and circulating air blower 26. Combination gas control 16 includes pilot circuitry for controlling and providing the pilot flame.

Burner assembly 14 includes at least one inshot burner 28 for at least one primary heat exchanger 30. Burner 28 receives a flow of combustible gas from gas regulator 16 and injects the fuel gas into primary heat exchanger 30. A part of the injection process includes drawing air into heat exchanger assembly 18 so that the fuel gas and air mixture may be combusted therein. A flow of combustion air is delivered through combustion air inlet 32 to be mixed with the gas delivered to burner assembly 14.

Primary heat exchanger 30 includes an outlet 34 opening into chamber 36. Connected to chamber 36 and in fluid communication therewith are at least four condensing heat exchangers 38 having an inlet 40 and an outlet 42. Outlet 42 opens into chamber 44 for venting exhaust flue gases and condensate.

Inducer housing 20 is connected to chamber 44 and has mounted thereon an inducer motor 22 together with inducer wheel 24 for drawing the combusted fuel air mixture from burner assembly 14 through heat exchanger assembly 18. Air blower 26 is driven by electronically commutated motor (ECM) 25 and delivers air to be heated upwardly in a counterflow arrangement through air passage 52 and over heat exchanger assembly 18. The cool air passing over condensing heat exchanger 38 lowers the heat exchanger wall temperature below the dew point of the combusted fuel air mixture causing a portion of the water vapor in the combusted fuel air mixture to condense, thereby recovering a portion of the sensible and latent heat energy. The condensate formed within heat exchanger 38 flows through chamber 44 into drain tube 46 to condensate trap assembly 48. As air blower 26 continues to urge a flow of air upwardly through heat exchanger assembly 18, heat energy is transferred from the combusted fuel air mixture flowing through heat exchangers 30 and 38 to heat the air circulated by blower 26. Finally, the combusted fuel air mixture that flows through heat exchangers 30 and 38 exits through outlet 42 and is then delivered by inducer motor 22 through exhaust gas outlet 50 and thence to a vent pipe (not illustrated).

Cabinet 12 also houses microprocessor control assembly 54, LED display 56, pressure tap 58 located at primary heat exchanger inlet 60, pressure tap 62 located at condensing heat exchanger outlet 42 and limit switch 64 disposed in air passage 52. In a non-condensing furnace, pressure tap 62 would be disposed at primary heat exchanger outlet 34, since there would be no condensing heat exchanger 38.

Figure 2:
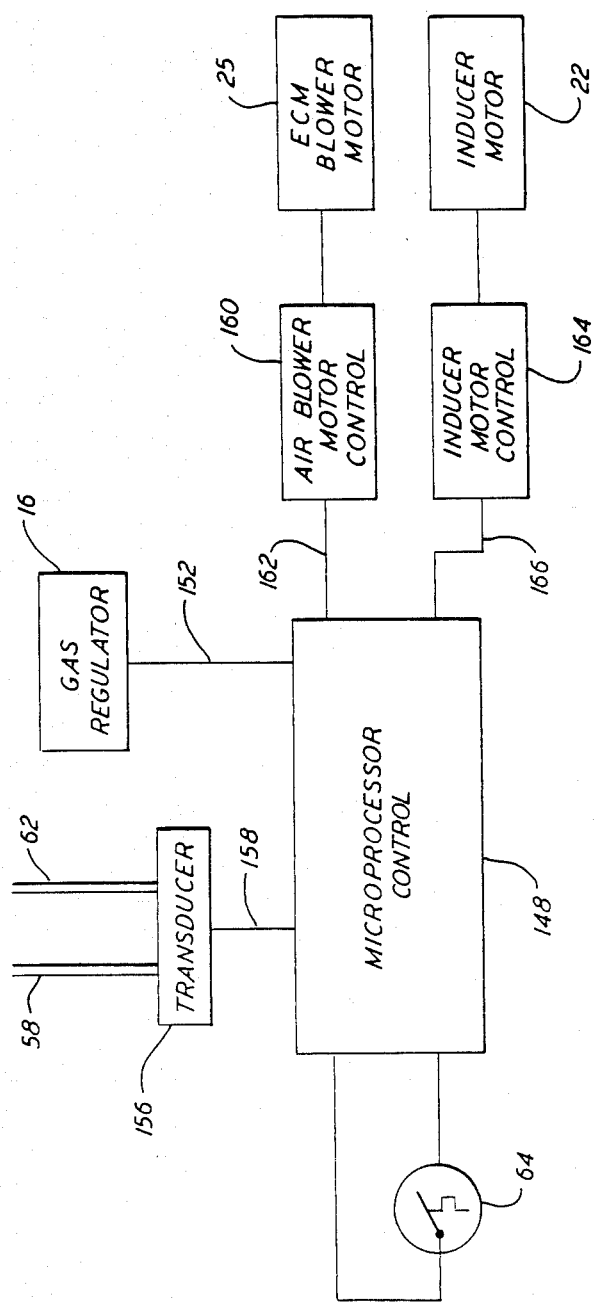
FIG. 2 is a block diagram of a portion of the furnace control system.

Referring now to FIG. 2, microprocessor control 148 is located in microprocessor control assembly 54 in condensing furnace 10 and is capable of being preprogrammed to generate a plurality of control signals in response to received input signals. The simplified block diagram illustrates the interconnection between microprocessor control 148 and pressure taps 58 and 62 through differential pressure transducer 156 which generates an analog signal indicative of the differential pressure. Microprocessor control 148 is also electrically connected to limit switch 64, to gas regulator 16 through electrical lines 152, to air blower motor control 160 of ECM 25 of air blower 26 through electrical lines 162, and to inducer motor control 164 of inducer motor 22 through electrical lines 166. Air blower motor control 160 and inducer motor control 164 respectively control the rate of fluid flow created by air blower 26 and inducer wheel 24. Ignition of the pilot flame is proved by the pilot circuitry in the pilot control of gas regulator 16 and a signal is generated to microprocessor control 148 through electrical lines 152 to indicate that the flame is proved.

During this period of time, microprocessor control 148 is monitoring the pressure drop across heat exchanger assembly 18 through pressure taps 58 and 62 which transmit pressure readings to differential pressure transducer 156. Differential pressure transducer 156 sends a pressure differential signal indicative of the pressure drop across heat exchanger assembly 18 through electrical lines 158 to microprocessor control 148. After microprocessor control 148 determines that a sufficient pressure drop exists across heat exchanger assembly 18, that the gas pressure in gas regulator 16 is at or above a predetermined pressure, and the pilot flame has been proved, microprocessor control 148 is programmed to generate a voltage signal through electrical lines 152 to a solenoid (not illustrated) in regulator 16 for controlling a gas flow.

Gas flow is provided by gas control 16 to burner assembly 14 and the fuel air mixture is combusted by inshot burner 28. The combusted fuel air mixture is then drawn through heat exchanger assembly 18 and out exhaust gas outlet 50 by the rotation of inducer wheel 24 by motor 22. After a preselected period of time, for example, one minute, to ensure heat exchanger assembly 18 has reached a predetermined temperature, microprocessor control 148 is preprogrammed to generate a signal through electrical lines 162 to air blower motor control 160, which starts ECM 25 of air blower 26 to provide a flow of air to be heated over condensing heat exchanger 38 and primary heat exchanger 30. Any condensate that forms in condensing heat exchanger 38 is delivered through drain tube 46 to condensate trap assembly 48. After the heating load has been satisfied, the contacts of the thermostat (not illustrated) open, and in response thereto microprocessor control 148 de-energizes gas regulator 16 ceasing the supplying of fuel. This naturally causes the pilot flame and burner flame to be extinguished.

After gas control 16 is de-energized, microprocessor control 148 generates a signal over electrical lines 166 to inducer motor control 164 to terminate operation of inducer motor 22. After inducer motor 22 has been de-energized, microprocessor control 148 is further preprogrammed to generate a signal over lines 162 to air blower motor control 160 to de-energize ECM 25, thereby terminating operation of air blower 26, after a preselected period of time, for example, 60–240 seconds. This continual running of air blower 26 for this predetermined amount of time permits further heat transfer between the air to be heated and the heat being generated through heat exchanger assembly 18, which also naturally serves to cool heat exchanger assembly 18.

Because the pressure drop through heat exchanger assembly 18 can vary due to changing conditions or parameters, microprocessor control 148 is preprogrammed to ensure an optimum manifold gas pressure as a function of the amount of combustion air flowing through combustion air inlet 32 under the influence of inducer wheel 24. The pressure drop through heat exchanger assembly 18 is measured by pressure taps 58 and 62 which transmit their individual pressure readings to differential pressure transducer 156. Transducer 156 then generates a pressure differential signal to microprocessor control 148 over electrical lines 158 indicative of the pressure drop through heat exchanger assembly 18. An empirically determined equation for optimum manifold gas pressure versus heat exchanger pressure drop is programmed into microprocessor control 148 whereby it determines the optimum manifold gas pressure for a particular pressure drop through heat exchanger assembly 18, as indicated by the pressure differential signal received from differential pressure transducer 156. As the pressure drop varies, microprocessor control 148 generates a signal to gas regulator 16 over electrical lines 152 to regulate the fuel supply and a signal to inducer motor control 164 via line 166 to regulate the combustion air. During continued operation of furnace 10, microprocessor control 148 continues to make adjustments in the gas flow rate and inducer pressure drop through heat exchanger assembly 18 as a function of certain variable parameters, such as line pressure, supply voltage, temperature changes, vent pipe length, furnace altitude, and the like. Thus, gas control 16 and microprocessor control 148 provides essentially an infinite number of gas flow rates between a zero flow rate and a maximum flow rate in a selected range of, for example, two inches to fourteen inches W.C. (water column).

Determination of insufficient or too much combustion air flowing through combustion air inlet 32 is determined by the pressure drop across heat exchanger assembly 18. This pressure drop is measured by pressure taps 58 and 62 and a signal is generated in response thereto by differential pressure transducer 156 to microprocessor control 148. Generally, for each pressure differential value, there is one optimum manifold gas pressure and one optimum combustion air flow rate. Thus, assuming the manifold gas pressure is substantially constant, variations in certain parameters can require adjustment to the combustion air flow rate as provided by inducer wheel 24.

Upon determining insufficient combustion air flow through burner assembly 14, as indicated by a low pressure drop across heat exchanger assembly 18, microprocessor control 148 generates a speed increase signal to inducer motor control 164 to increase the combustion air flow rate through heat exchanger assembly 18 and increase the pressure drop through heat exchanger assembly 18. Because of the variations in furnace gas input, the microprocessor control 148 must also adjust the airflow or CFM across the heat exchanger assembly 18 to maintain the desired temperature rise of the circulating air at each input rate. Temperature limit switch 64 which is connected to microprocessor control 148 opens when the temperature in air passage 52 exceeds a predetermined temperature limit indicative of insufficient air flow.

From the foregoing description, it is clear that the ECM 25 must be accurately controlled by microprocessor control 148 to optimize operation of furnace 10. To achieve the necessary control, the following calibration technique for sensing the load on the circulating air delivery system was developed using an ECM 25 wherein the speed input signal is adjusted to obtain the desired air delivery. An ECM 25, such as is available from General Electric as part number 5SME39HGH6-9IT, varies speed with a change in percent duty cycle and air blower motor control 160 generates an RPM output signal of 36 pulses per revolution. To control ECM 25 so that it maintains an appropriate air delivery for a specified air temperature rise or for a given cooling load, a reference torque and a corresponding RPM vs. CFM relationship has to be established. Using the fan curves illustrated in FIG. 3, a reference torque of 5.8 oz. ft. was arbitrarily chosen. Laboratory tests using a DD10-7A Morrison blower wheel manufactured by Morrison Products Inc. of Cleveland, Ohio established the following relationship for any furnace with that blower wheel:

$$CFM_r = 865.893 - (0.74539)(RPM_r) \quad (Eq. 1)$$

where $CFM_r$ is the reference CFM and $RPM_r$ is the reference RPM.

Figure 4:
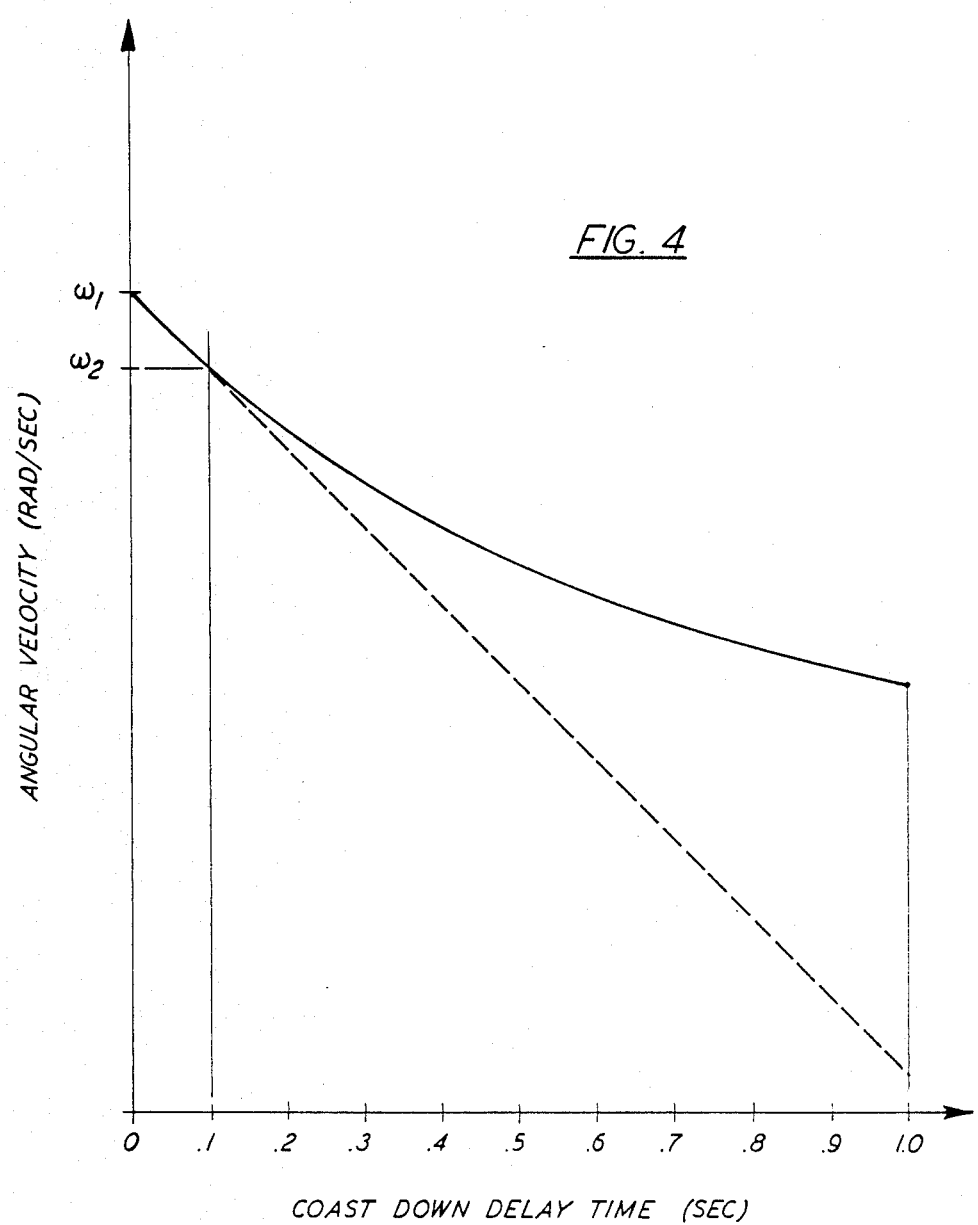
FIG. 4 is a constant torque plot of angular velocity in radians per second vs. coast down delay time in seconds.
Figure 5:
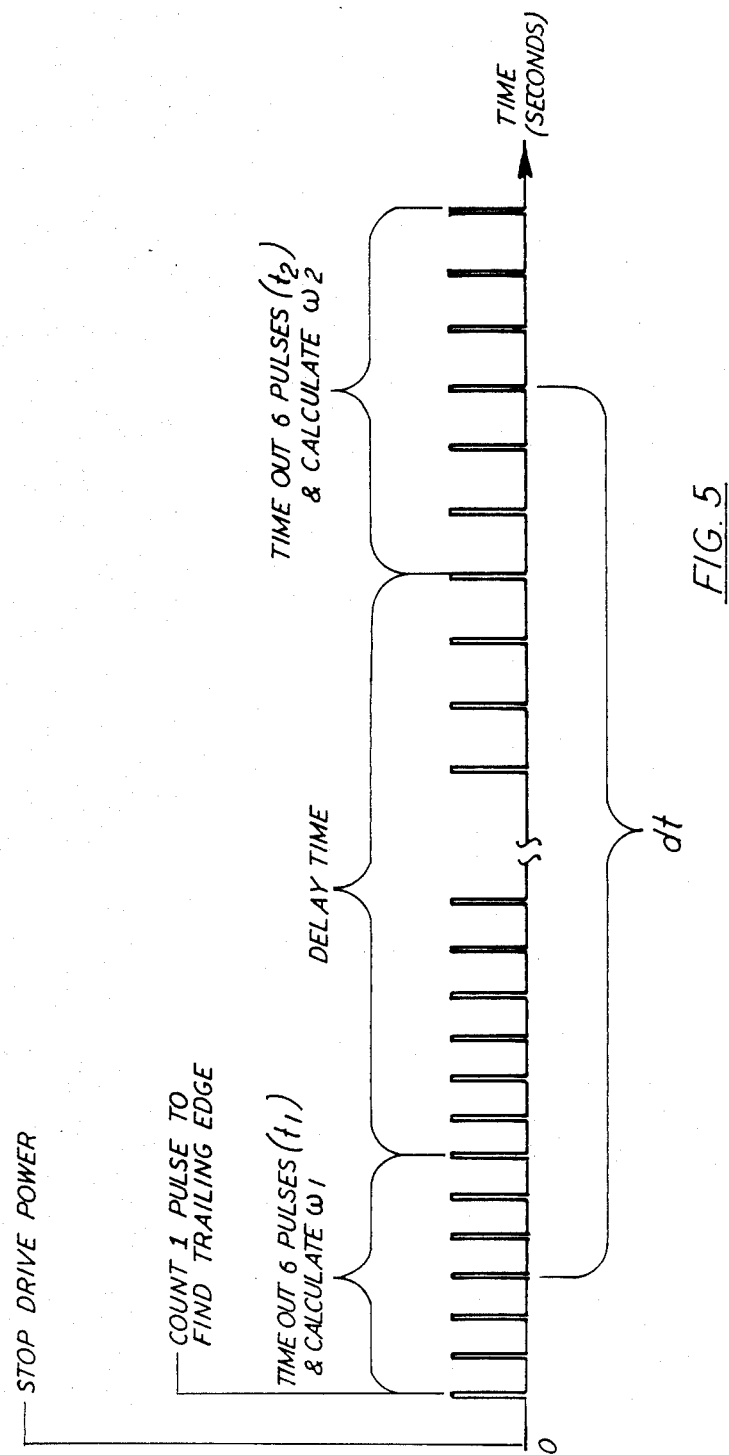
FIG. 5 is a graphical representation of the pulse counting technique.

To determine the torque acting on the motor and blower wheel, while it was slowing down, the calibration procedure of the present invention was developed. This procedure assumes a constant torque straight line slow down characteristic within the system. From physics it is known that $$T_a = I(d\omega/dt) \quad (Eq. 2)$$

where $T_a$ is the actual torque, I is the moment of inertia of the blower wheel and $d\omega/dt$ is the change in angular velocity in rad/sec$^2$. The moment of inertia, I, for the blower wheel has a constant value of 0.36 oz-ft-sec$^2$ as determined in the laboratory. To determine the torque when the moment of inertia is known, it is only necessary to determine $d\omega/dt$ to solve Eq. 2. Referring now to FIG. 4, it is readily apparent that the actual angular velocity shown as a solid line and the straight line projection shown as a dashed line are essentially identical, and linear, for the earliest portion of the coast down which corresponds to approximately 0.1 second. Thus the change in angular velocity, $d\omega/dt$, can be measured during a brief off-period where two instantaneous RPM readings are taken over a short time interval. The short time interval is necessary because, as shown in FIG. 4, the constant torque slowdown characteristics within the system become non-linear with larger time intervals. This short time interval also allows the procedure to become virtually undetectable because it occurs in one revolution of the motor. As noted above, the air blower motor control 160 generates an RPM output signal of 36 pulses per revolution or one pulse every 10° of rotation. Obviously, the pulse frequency varies directly with the RPM and the time between pulses varies inversely with the RPM. Referring now to FIG. 5, a coast down procedure is initiated by stopping or reducing the drive power and one pulse is counted to find the trailing edge and the time, $t_1$ for six pulses is determined. Next, the time for additional pulses is measured and called the delay time. The value of 30 pulses was chosen to allow the rotor to be in the same angular position when measuring $t_2$ as it was when $t_1$ was measured and to thereby eliminate vibrational errors. Then the time, $t_2$, for six more pulses is determined. Knowing the time for six pulses to occur and that there are 36 pulses per revolution, the angular velocities $\omega_1$ and $\omega_2$, in radians per second can be determined from the following equation $$\omega_i = (6)(2\pi)/(36)t_i \quad (Eq. 3)$$

where the subscript i represents the integer 1, 2, etc. and $$d\omega = \omega_1 - \omega_2$$

The average RPM, $RPM_a$, during the measurement of t, and $t_2$ is calculated from the equation $$RPM_a = [(\omega_1 + \omega_2)/2](60)/2\pi \quad (Eq. 4)$$

Because $t_1$ and $t_2$ represent a period of time, the angular velocities $\omega_1$ and $\omega_2$ represent the average velocities for those time periods. The value of dt in seconds can then be determined $$dt = (t_1/2) + \text{delay time} + (t_2/2) \quad (Eq. 5)$$

Knowing $d\omega$ (Eq. 3), dt (Eq. 5) and I (from laboratory tests), the torque acting on the blower wheel to slow it down can be calculated using Eq. 2. Next, using Eq. 1 which was determined from laboratory data, a relationship for CFM and RPM at a constant motor torque of 5.8 ounce-feet is obtained. From the fan laws equations 6 and 7 are obtained which relate RPM, torque and CFM $$(RPM_r/RPM_a)^2 = (T_r/T_a) \quad \text{(Eq. 6)}$$

$$(RPM_d/RPM_r) = (CFM_d/CFM_r) \quad \text{(Eq. 7)}$$

In Eq. 6 and 7 the subscripts r, a and d respectively designate reference, actual or average and desired. Using equations 1, 2, 6 and 7

$$RPM_d = \frac{(CFM_d)(RPM_a)(4.5723)\sqrt{(dt/d\omega)}}{865.89 - (3.4083)(RPM_a)\sqrt{(dt/d\omega)}} \quad \text{(Eq 8)}$$

and this determines the motor RPM needed to obtain the desired CFM.

The basic principles as applied to the operation of furnace 10 require ECM 25 to be energized at an arbitrary pulse width between 15 to 20 percent for approximately 15 to 20 seconds which allows the motor RPM to stabilize quickly. Then, the motor power is turned off for a short time interval (e.g. for one revolution), as illustrated in FIG. 5. The coast down torque $T_a$ is then established using Eq. 2 and $RPM_a$ is determined using Eq. 4 during the coast down and used to calculate the reference $RPM_r$ using equation 9.

$$RPM_r = RPM_a \sqrt{(5.8/T_a)} \quad \text{(Eq 9)}$$

Using Eq. 1, $CFM_r$ can then be determined which can then be used in Eq. 7 to determine $RPM_d$. The speed of ECM 25 is then changed to provide the RPM required by the system ($RPM_d$) to deliver the needed CFM ($CFM_d$). Periodic updates can be made by repeating the above-described procedure at the operating speed most recently obtained.

Figure 3:
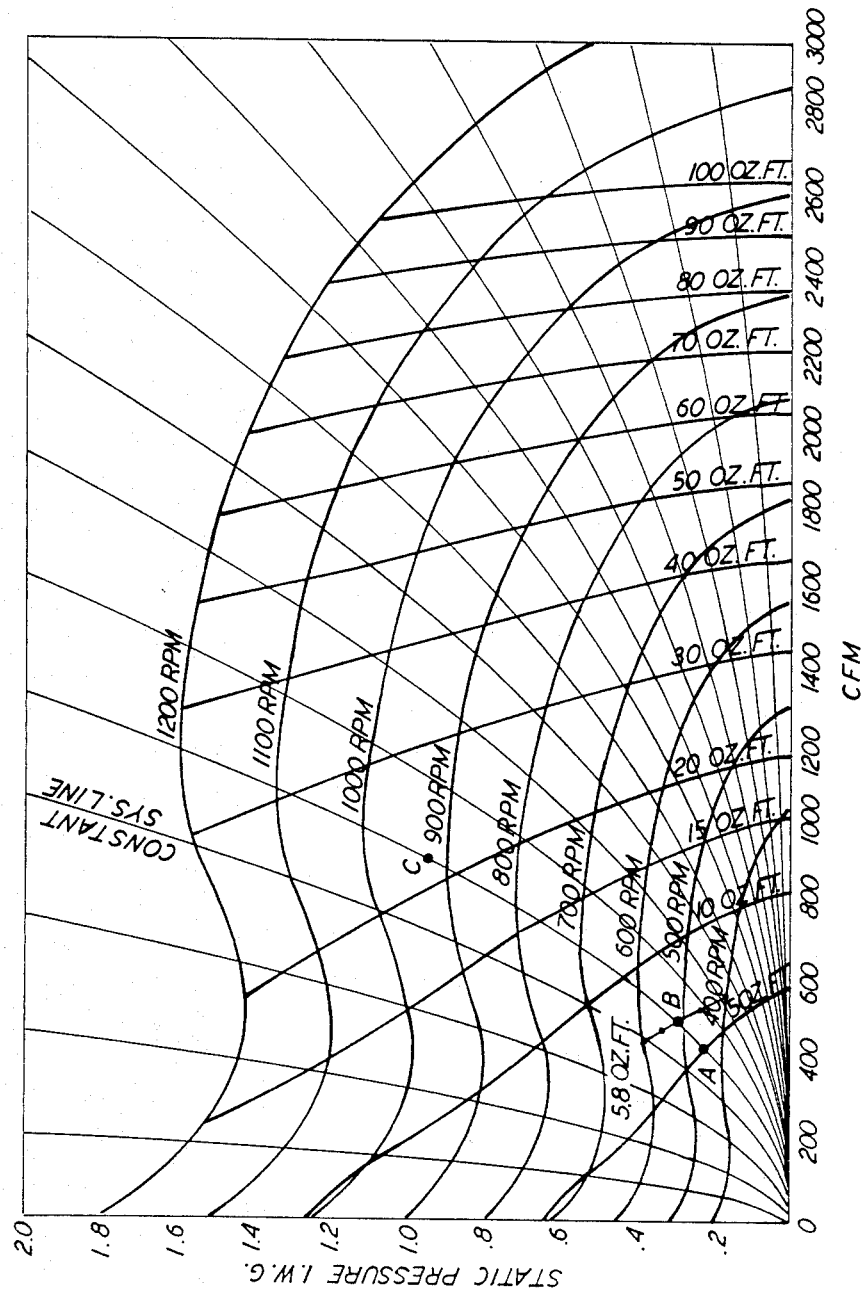
FIG. 3 is a standard fan curve for static pressure in inches of water gage (I.W.G.) vs. CFM at various torques in ounce-feet and RPMs.

A graphical representation of a portion of the foregoing procedure is illustrated in FIG. 3. Point A's RPM and torque reading can be used to calculate $RPM_r$ at point B by using Eq. 9. $CFM_r$ can then be determined from Eq. 1 which then permits the determination of $RPM_d$ at point C by using Eq. 7. Note that points A, B, and C fall on the same constant system line since they represent a specific system configuration.

Figure 6:
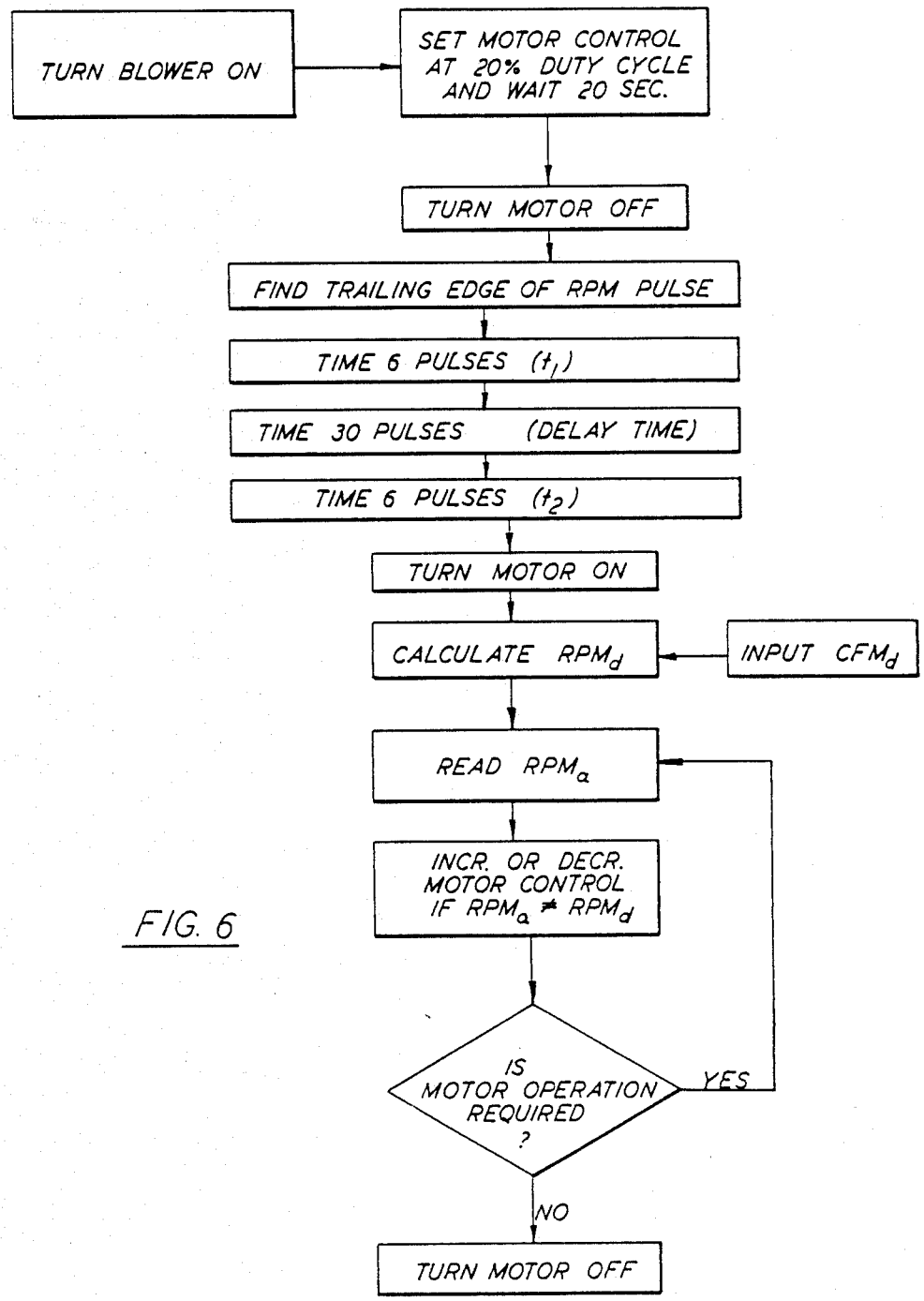
FIG. 6 is a flow chart of the calibration technique with a method of control.

A flow chart of the calibration technique with a method of control is illustrated in FIG. 6. This technique eliminates the necessity for manually calibrating the ECM blower motor controller.

As a verification of the procedure used to establish the relationship of Eq. 1, the steady-state efficiency can be determined by conventional means and used to determine the actual CFM, $CFM_a$, being delivered $$CFM_a = Qn/(1.088\Delta T) \quad \text{(Eq. 10)}$$

where Q is the input rate in Btu/hr., n is the steady state efficiency and $\Delta T$ is the temperature rise. $CFM_a$ can then be compared to $CMF_d$ to verify correct air delivery.

Several approaches to updating the operating information are possible in addition to the described procedures There can be a single measurement or several averaged measurements. There can be a single measurement on turn off which can be stored and used for regulating ECM 25 on the next start up. Measurements can also be at regular intervals wherein the motor is momentarily turned off or whenever there is a reason to believe that the system static pressure has changed.

Although the present invention has been illustrated and described in the environment of a condensing furnace, it can be used to control an ECM or any variable speed motor in any environment where the torque of the motor can be related to the desired operation of the system and the motor speed is adjusted to obtain the desired value. It is, therefore, intended that the present invention is to be limited only by the scope of the appended claims.

What is claimed is:

1. A technique for calibrating and controlling a variable speed motor operated in response to a microprocessor to regulate the rotation of an air moving device driven by the motor comprising the steps of:
   choosing a reference torque;
   at the reference torque determining a reference CFM and RPM;
   determining the moment of inertia for the air moving device;
   selecting an arbitrary motor speed input;
   energizing and operating the motor at the selected arbitrary speed input for a sufficient time to allow the RPM of the motor to stabilize;
   de-energizing the motor for a short predetermined time period to cause the motor and air moving device to slow down and making two measurements of the angular velocity of the air moving device over the predetermined time period;
   determining the actual load torque acting on the air moving device over the average actual RPM during the predetermined time period;
   determining the desired RPM as a function of the actual load torque; and
   adjusting the motor to the desired RPM to thereby achieve the desired CFM output of the air moving device.

2. The technique of claim 1 wherein the motor is an ECM.

3. The technique of claim 1 wherein the reference torque is 5.8 ounce-feet.

4. The technique of claim 1 wherein the arbitrary motor speed input is 15–20%.

5. A coast down technique for calibrating and controlling an electronically commutated motor operated in response to a microprocessor to regulate the rotation of an air moving device driven by the motor comprising the steps of:
   choosing a reference torque;
   at the reference torque determining a reference CFM and RPM;
   determining the moment of inertia for the air moving device;
   selecting an arbitrary motor speed input;
   energizing and operating the motor at the selected arbitrary speed input for a sufficient time to allow the RPM of the motor to stabilize;
   cyclically within a predetermined time period sequentially ceasing the energizing of the motor to cause the air moving device to coast down and making multiple measurements of the angular velocity of the air moving device at predetermined time intervals and re-energizing the motor between coast downs;

determining the average actual torque acting on the air moving device over the average actual RPM during the coast downs;

determining the desired RPM knowing the average actual load torque; and adjusting the motor to the desired RPM to thereby achieve the desired CMF output of the air moving device.

6. The technique of claim 5 wherein the reference torque is 5.8 ounce-feet.

7. The technique of claim 5 wherein the arbitrary motor speed input is 15–20%.

* * * * *